No. 625,566. Patented May 23, 1899.
F. KING.
MANUFACTURE OF ELEMENTS FOR SECONDARY BATTERIES.
(Application filed Nov. 25, 1898.)
(No Model.)
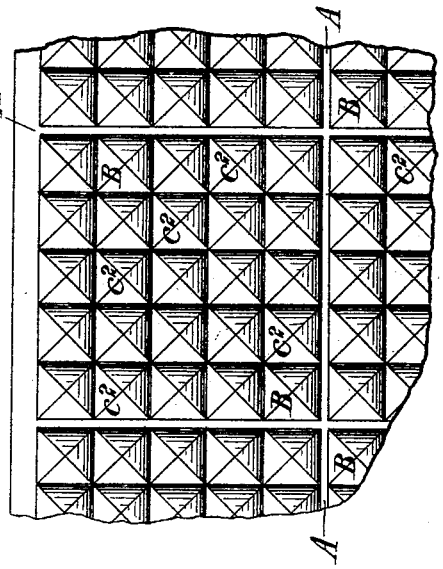
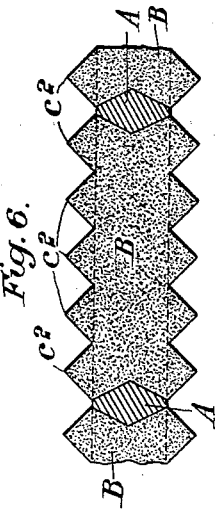
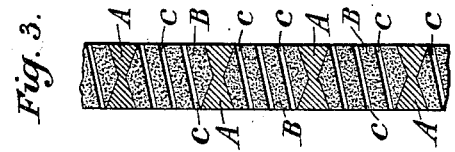
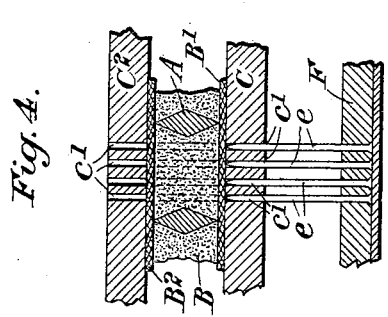
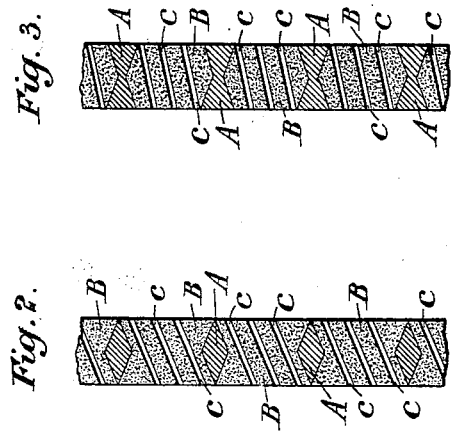
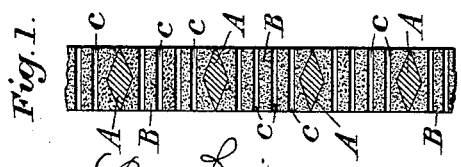
THE NORRIS PETERS CO., PHOTO-LITHO., WASHINGTON, D. C.

UNITED STATES PATENT OFFICE.

FRANK KING, OF LONDON, ENGLAND, ASSIGNOR TO JOHN IRVING COURTENAY, OF SAME PLACE.

MANUFACTURE OF ELEMENTS FOR SECONDARY BATTERIES.

SPECIFICATION forming part of Letters Patent No. 625,566, dated May 23, 1899.

Application filed November 25, 1898. Serial No. 697,413. (No model.)

*To all whom it may concern:*

Be it known that I, FRANK KING, electrical engineer, a subject of the Queen of Great Britain and Ireland, and a resident of 4 Great Winchester street, in the city of London, England, have invented certain new and useful Improvements in the Manufacture and Production of Elements or Plates for Secondary Batteries or Electrical Accumulators, (for which I have applied for patents in Great Britain, No. 11,155, dated May 10, 1898, No. 11,858, dated May 25, 1898, and No. 12,313, dated June 1, 1898,) of which the following is a specification.

The object of my invention is to obviate or considerably lessen the fall in electrical capacity which takes place in secondary batteries or electrical accumulators, more especially when such batteries or accumulators are charged or discharged at high average rates of current. I have discovered that the fall in electrical capacity under these circumstances is due mainly to the fact that a discharge at high rates of current decomposes principally the surface of the electrode electrically nearest to the electrode of opposite denomination, and in the case of the porous-lead plate or electrode this decomposition of the surface is accompanied by the formation of sulfate of lead, which obstructs and sooner or later closes access to the pores of the otherwise active material and in consequence of this discharge at high rates of any particular battery or set of plates results in a diminished capacity to that obtained when the discharge is at low rates. When the charge is applied for the purpose of restoring the battery to its original condition of electrical usefulness, the sulfate formed on the porous-lead plate by the action of the discharge is reduced to pure lead, forming a coherent layer of metallic lead, which by repeated discharges and charges gradually becomes so dense as to be almost impermeable, and the plate or element is much less capable of absorbing the results of the applied electric energy. The capacity of the battery becomes reduced down to the capacity of a mere rough surface of lead principally because such a superposed layer of non-porous lead obstructs the oxidizing effect of the charge and discharge on the interior of the porous mass of active material. When, however, the discharge and charge are carried on at low rates of current—such, for instance, as about two or three amperes per square foot of visible plate-surface—such objectionable formation of the dense or non-porous layer of metallic lead is greatly reduced or retarded, insomuch that the oxidizing, and consequently sulfating, effect does not then necessarily take place wholly on the surface, but also in and among the pores of the spongy lead, and the full advantage of the spongy character of the active material and increase of active surface is obtained.

My invention has for its object to effect an increase of the superficial area of the porous material exposed to the electrolyte, so that the rate of discharge or charge is reduced proportionally to the increase of such area, and the formation of the impervious layer of metallic lead is spread over a larger area, and by virtue of the reduced rate obtained by such increase of area the results of the action of charge and discharge are more dispersed among the pores of the active material. This I effect by making perforations in or through or projections from or recesses in the surfaces of the active material or paste which is held in or between the grid or grids of electrical elements or plates. For example, I may perforate the active material, so as to allow of the access and circulation of the electrolyte. For instance, in any ordinary porous-lead pasted secondary-battery plate of, say, one-fourth inch in thickness in which each pellet of active material had a visible superficial area of one-fourth square inch I perforate each pellet, say, for example, with sixteen holes, and if these perforations be made with needles of or about .03-inch diameter the increase of superficial area thereby obtained will be equivalent to doubling the total active area of the plate.

I prefer to make the perforations at an inclination to the vertical, so as to permit of the strong acid formed during charge falling away by gravity, and thus to intermingle with the electrolyte.

I prefer to make the perforations as follows:

I subject the plate (when freshly pasted with the material to become active) to pressure with the intervention of a semi elastic or compressible material—such as felt, asbestos, or the like—and while the paste is under such compression and in a plastic condition I perforate or make interstices in the paste by means of a number of needles or punches passing through and working more or less freely in the compressing plate or plates of a press. By introducing the needles or punches into the mass of the paste or pellets thereof while the plate as a whole is under compression and while the paste is soft and unset I avoid the risk of rupture of the pellets of paste or of the breaking away of the paste from the supporting-grid or support. While the whole is still under pressure, the needles or punches are withdrawn, and the pressure may then be relieved and the plate be removed, when the pasted material will be comparatively hard and nearly dry and the perforations or interstices as nearly as possible perfect in form and position.

I sometimes perforate the mass by means of a set or series of needles or punches arranged to pass right through from one side, or I may perform the operation by applying the needles or punches to both sides or surfaces of the paste, so that the said needles or punches either meet in the mass or pass each other at prearranged distances. By lessening the length of the stroke of the said needles or punches I can reduce the perforations to any extent, even to mere cellular interstices.

When the increase of surface is to be obtained by means of projections instead of by perforations, I preferably make the projections in the form of juxtaposed pyramids whose sides preferably form equilateral triangles, as this form I find gives very good results as regards increase of surface and coherence of the material. The projections may be formed by dies provided with recesses corresponding to the projections to be formed and pressed into the paste or active material while it is in a plastic condition.

Figure 1 shows in section part of an ordinary pasted plate having the perforations at right angles to the face of the plate. Fig. 2 shows part of a similar plate with perforations inclined to the faces of the plate, and Fig. 3 shows part of a plate in which the grid is formed or constructed around pellets of active material. In all the figures, A indicates the grid or support, B active material or paste, and $c$ the perforations. Fig. 4 illustrates means by which the perforation can be effected.

A represents part of the pasted plate or element to be perforated.

$B'$ $B^2$ are the layers of felt, asbestos, or equivalent material, which lie between the plate or element and the plates of the press.

$C$ $C^2$ are the plates of the press, which may be moved toward and away from each other by any convenient means usually adopted in presses.

$c'$ $c'$ are the holes through the plates $C$ $C^2$, through which the needles pass, the said holes acting as guides and supports to the said needles when passing through the felt or equivalent material $B'$ and the pasted material in the plate A.

$e$ $e$ $e$ are the needles carried by the needle-plate F.

The operation is as follows: The plate or element A, with the open portion of its grid-like structure filled with the pasted material, is placed on the lower plate C of the press, there being, however, a layer of felt or equivalent material $B'$ between it and the said plate C. A similar layer of felt or equivalent material $B^2$ is placed on the plate or element A, and the plates $C$ $C^2$ are brought nearer together by any suitable means, such as are usually employed in a press, and a large quantity of the liquid is thereby expelled from the paste in the element or plate. The needle-plate F is then moved so that the needles pass through the guide-holes $c'$ and through the felt or equivalent material and through the active material or paste. The needles are then withdrawn by the reverse movement of the needle-plate F, and afterward the pressure on the plate or element is withdrawn by separating the plates $C$ $C^2$ of the press, and the plate or element A, with its paste or active material perforated, as described, is removed.

I have shown the needles as penetrating from one side; but they can penetrate one set from one side and another set from the other side and either meet or pass at the side of each other.

Fig. 5 shows in section part of a plate or element in which the tops of the projections $c^2$ in the active material or paste B are level with the surface or edges of the grid or support A.

Fig. 6 shows in section part of a plate or element in which the projections $c^2$ of the active material or paste B are above the surface or edges of the grid or support A.

Fig. 7 is a face view of a grid or support of either of the kinds shown in Figs. 5 and 6, the projections being in the form of juxtaposed pyramids, which is the form I prefer, although I do not restrict myself to this particular form.

I do not limit myself to the forms of grids or supports shown, as my invention can be applied to elements or plates of all kinds in which the active material or paste is applied mechanically.

Having now particularly described and ascertained the nature of this invention and in what manner the same is to be performed, I declare that what I claim is—

1. An element for secondary batteries consisting of a grid having active material applied thereto, the outer or exposed surface of said active material being formed with pyramidal projections.

2. An element for secondary batteries consisting of a grid having active material applied thereto, the entire outer or exposed surface of said active material being in the form of juxtaposed pyramidal projections.

In testimony whereof I have signed this specification in the presence of two subscribing witnesses.

FRANK KING.

Witnesses:
WILLIAM JOHN WEEKS,
PERCY READ FOLDRING.